(12) United States Patent
Keller et al.

(10) Patent No.: US 7,296,122 B2
(45) Date of Patent: Nov. 13, 2007

(54) FLEXIBLE PROBE/PROBE RESPONSE ROUTING FOR MAINTAINING COHERENCY

(75) Inventors: James B. Keller, Palo Alto, CA (US); Dale E. Gulick, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 904 days.

(21) Appl. No.: 10/628,715

(22) Filed: Jul. 28, 2003

(65) Prior Publication Data

US 2004/0024836 A1 Feb. 5, 2004

Related U.S. Application Data

(63) Continuation of application No. 09/217,367, filed on Dec. 21, 1998, now Pat. No. 6,631,401.

(51) Int. Cl.
*G06F 12/14* (2006.01)
*G06F 12/16* (2006.01)

(52) U.S. Cl. ........................ 711/154; 711/141; 709/211; 709/214

(58) Field of Classification Search ...................... None
See application file for complete search history.

(56) References Cited

U.S. PATENT DOCUMENTS 5,303,362 A 4/1994 Butts, Jr. et al.
(Continued)

FOREIGN PATENT DOCUMENTS

EP 379 771 8/1990
(Continued)

OTHER PUBLICATIONS

Kumar et al., "Efficient and Scalable Cache Coherence Schemes for Shared Memory Hypercube Multiprocessors," © 1994 IEEE, Nov. 1994, pp. 498-507.

(Continued)

*Primary Examiner*—Patrice Winder
(74) *Attorney, Agent, or Firm*—Lawrence J. Merkel; Meyertons, Hood, Kivlin, Kowert & Goetzel, P.C.

(57) ABSTRACT

A computer system may include multiple processing nodes, one or more of which may be coupled to separate memories which may form a distributed memory system. The processing nodes may include caches, and the computer system may maintain coherency between the caches and the distributed memory system. Particularly, the computer system may implement a flexible probe command/response routing scheme. The scheme may employ an indication within the probe command which identifies a receiving node to receive the probe responses. For example, probe commands indicating that the target or the source of transaction should receive probe responses corresponding to the transaction may be included. Probe commands may specify the source of the transaction as the receiving node for read transactions (such that dirty data is delivered to the source node from the node storing the dirty data). On the other hand, for write transactions (in which data is being updated in memory at the target node of the transaction), the probe commands may specify the target of the transaction as the receiving node. In this manner, the target may determine when to commit the write data to memory and may receive any dirty data to be merged with the write data.

30 Claims, 11 Drawing Sheets

U.S. PATENT DOCUMENTS

| | | |
|---|---|---|
| 5,412,788 A | 5/1995 | Collins et al. |
| 5,517,494 A | 5/1996 | Green |
| 5,537,575 A | 7/1996 | Foley et al. |
| 5,560,038 A | 9/1996 | Haddock |
| 5,659,708 A | 8/1997 | Arimilli et al. |
| 5,673,413 A | 9/1997 | Deshpande et al. |
| 5,684,977 A | 11/1997 | Van Loo et al. |
| 5,749,095 A | 5/1998 | Hagersten |
| 5,859,983 A | 1/1999 | Heller et al. |
| 5,878,268 A | 3/1999 | Hagersten |
| 5,887,138 A | 3/1999 | Hagersten et al. |
| 5,893,144 A | 4/1999 | Wood et al. |
| 5,924,118 A | 7/1999 | Arimilli et al. |
| 5,966,729 A | 10/1999 | Phelps |
| 5,987,544 A | 11/1999 | Bannon et al. |
| 5,991,819 A | 11/1999 | Young |
| 6,012,127 A | 1/2000 | McDonald et al. |
| 6,018,791 A | 1/2000 | Arimilli et al. |
| 6,038,644 A | 3/2000 | Irie et al. |
| 6,049,851 A | 4/2000 | Bryg et al. |
| 6,070,231 A | 5/2000 | Ottinger |
| 6,085,263 A | 7/2000 | Sharma et al. |
| 6,098,115 A | 8/2000 | Eberhard et al. |
| 6,101,420 A | 8/2000 | VanDoren et al. |
| 6,108,737 A | 8/2000 | Sharma et al. |
| 6,108,752 A | 8/2000 | Van Doren et al. |
| 6,112,281 A | 8/2000 | Bamford et al. |
| 6,138,218 A | 10/2000 | Arimilli et al. |
| 6,199,153 B1 | 3/2001 | Razdan et al. |
| 6,209,065 B1 | 3/2001 | Van Doren et al. |
| 6,249,846 B1 | 6/2001 | Van Doren et al. |
| 6,275,905 B1 | 8/2001 | Keller et al. |
| 6,286,090 B1 | 9/2001 | Steely, Jr. et al. |
| 6,292,705 B1 | 9/2001 | Wang et al. |
| 6,295,583 B1 | 9/2001 | Razdan et al. |
| 6,370,621 B1 | 4/2002 | Keller |
| 6,631,401 B1 | 10/2003 | Keller et al. |

FOREIGN PATENT DOCUMENTS

| | | |
|---|---|---|
| EP | 412 353 | 2/1991 |
| EP | 611 026 | 8/1994 |
| EP | 777 184 | 6/1997 |
| EP | 0 817 076 | 1/1998 |
| EP | 0817073 A2 * | 1/1998 |
| EP | 0820016 A2 * | 1/1998 |

OTHER PUBLICATIONS

Laudon et al., "The SGI Origin: A ccNUMA Highly Scalable Server," © 1997 ACM, May 1997, pp. 241-251.

"RST Cache Memory Design for a Tightly Coupled Multiprocessor System," Cosimo A. Prete, *IEEE*, Apr. 11, 1991, No. 2, Los Alamitos, CA, pp. 16-19, 40-52.

"A New Write-Invalidate Snooping Cache Coherence Protocol for Split Transaction Bus-Based Multiprocessor Systems," Jhang, et al., IEEE, XP000463271, Oct. 19, 1993, pp. 229-232.

* cited by examiner

| Bit Time | 7 | 6 | 5 | 4 | 3 | 2 | 1 | 0 |
|---|---|---|---|---|---|---|---|---|
| 1 | | | CMD[5:0] | | | | | |
| 2 | | | | | | | | |

| Bit Time | 7 | 6 | 5 | 4 | 3 | 2 | 1 | 0 |
|---|---|---|---|---|---|---|---|---|
| 1 | DestNode[1:0] | | CMD[5:0] | | | | | |
| 2 | SrcTag[1:0] | | SrcNode[3:0] | | | | DestNode[3:2] | |
| 3 | | | SrcTag[6:2] | | | | | |
| 4 | Addr[7:0] | | | | | | | |
| 5 | Addr[15:8] | | | | | | | |
| 6 | Addr[23:16] | | | | | | | |
| 7 | Addr[31:24] | | | | | | | |
| 8 | Addr[39:32] | | | | | | | |

| Bit Time | 7 | 6 | 5 | 4 | 3 | 2 | 1 | 0 |
|---|---|---|---|---|---|---|---|---|
| 1 | DestNode[1:0] | | CMD[5:0] | | | | | |
| 2 | SrcTag[1:0] | | SrcNode[3:0] | | | | DestNode[3:2] | |
| 3 | | | | SrcTag[6:2] | | | | |
| 4 | | | | | | | | |

FIG. 5

| Bit Time | 7 | 6 | 5 | 4 | 3 | 2 | 1 | 0 |
|---|---|---|---|---|---|---|---|---|
| 1 | Data[7:0] | | | | | | | |
| 2 | Data[15:8] | | | | | | | |
| 3 | Data[23:16] | | | | | | | |
| 4 | Data[31:24] | | | | | | | |
| 5 | Data[39:32] | | | | | | | |
| 6 | Data[47:40] | | | | | | | |
| 7 | Data[55:48] | | | | | | | |
| 8 | Data[63:56] | | | | | | | |

FIG. 6

| CMD Code | Command | Packet Type |
|---|---|---|
| 000000 | Nop | Info |
| 000001 | Interrupt Broadcast | |
| 00001x | Reserved | - |
| 000100 | Probe/Src | Address |
| 000101 | Probe/Tgt | Address |
| 00011x | Reserved | - |
| 001000 | RdBlkS | Address |
| 001001 | RdBlk | Address |
| 001010 | RdBlkMod | Address |
| 001011 | ChangetoDirty | Address |
| 001100 | ValidateBlk | Address |
| 001101 | CleanVicBlk | Address |
| 001110 | Interrupt Target | |
| 001111 | VicBlk | Address |
| 01xxxx | ReadSized | Address |
| 10xxxx | WrSized | Address |
| 11000x | RdResponse | Response |
| 11001x | Reserved | - |
| 11010x | ProbeResp | Response |
| 11011x | Reserved | - |
| 111000 | SrcDone | Response |
| 111001 | MemCancel | Response |
| 111010 | TgtStart | Response |
| 111011 | Reserved | - |
| 11110x | TgtDone | Response |
| 111110 | IntrResponse | Response |
| 111111 | Error | Info |

| Bit Time | 7 | 6 | 5 | 4 | 3 | 2 | 1 | 0 |
|---|---|---|---|---|---|---|---|---|
| 1 | TgtNode[1:0] | | CMD[5:0] | | | | | |
| 2 | SrcTag[1:0] | | SrcNode[3:0] | | | | TgtNode[3:2] | |
| 3 | NextState[1:0] | | DM | SrcTag[6:2] | | | | |
| 4 | Addr[7:0] | | | | | | | |
| 5 | Addr[15:8] | | | | | | | |
| 6 | Addr[23:16] | | | | | | | |
| 7 | Addr[31:24] | | | | | | | |
| 8 | Addr[39:32] | | | | | | | |

| Bit Time | 7 | 6 | 5 | 4 | 3 | 2 | 1 | 0 |
|---|---|---|---|---|---|---|---|---|
| 1 | RespNode[1:0] | | CMD[5:0] | | | | | |
| 2 | SrcTag[1:0] | | SrcNode[3:0] | | | | RespNode[3:2] | |
| 3 | Rsv | | Hit | SrcTag[6:2] | | | | |
| 4 | Rsv | | | | | | | |

| Bit Time | 7 | 6 | 5 | 4 | 3 | 2 | 1 | 0 |
|---|---|---|---|---|---|---|---|---|
| 1 | RespNode[1:0] | | CMD[5:0] | | | | | |
| 2 | SrcTag[1:0] | | SrcNode[3:0] | | | | RespNode[3:2] | |
| 3 | Count | | SrcTag[6:2] | | | | | |
| 4 | Rsv | | | | | | Prb | Type |

44 ⤴

FLEXIBLE PROBE/PROBE RESPONSE ROUTING FOR MAINTAINING COHERENCY

This application is a continuation of U.S. patent application Ser. No. 09/217,367 filed Dec. 21, 1998 U.S. Pat. No. 6,631,401 B1.

BACKGROUND OF THE INVENTION

1. Field of the Invention

This invention is related to the field of computer systems and, more particularly, to coherency systems within computer systems.

2. Description of the Related Art

Generally, personal computers (PCs) and other types of computer systems have been designed around a shared bus system for accessing memory. One or more processors and one or more input/output (I/O) devices are coupled to memory through the shared bus. The I/O devices may be coupled to the shared bus through an I/O bridge which manages the transfer of information between the shared bus and the I/O devices, while processors are typically coupled directly to the shared bus or are coupled through a cache hierarchy to the shared bus.

Unfortunately, shared bus systems suffer from several drawbacks. For example, since there are multiple devices attached to the shared bus, the bus is typically operated at a relatively low frequency. The multiple attachments present a high capacitive load to a device driving a signal on the bus, and the multiple attach points present a relatively complicated transmission line model for high frequencies. Accordingly, the frequency remains low, and bandwidth available on the shared bus is similarly relatively low. The low bandwidth presents a barrier to attaching additional devices to the shared bus, as performance may be limited by available bandwidth.

Another disadvantage of the shared bus system is a lack of scalability to larger numbers of devices. As mentioned above, the amount of bandwidth is fixed (and may decrease if adding additional devices reduces the operable frequency of the bus). Once the bandwidth requirements of the devices attached to the bus (either directly or indirectly) exceeds the available bandwidth of the bus, devices will frequently be stalled when attempting access to the bus. Overall performance may be decreased.

One or more of the above problems may be addressed using a distributed memory system. A computer system employing a distributed memory system includes multiple nodes. Two or more of the nodes are connected to memory, and the nodes are interconnected using any suitable interconnect. For example, each node may be connected to each other node using dedicated lines. Alternatively, each node may connect to a fixed number of other nodes, and transactions may be routed from a first node to a second node to which the first node is not directly connected via one or more intermediate nodes. The memory address space is assigned across the memories in each node.

Nodes may additionally include one or more processors. The processors typically include caches which store cache blocks of data read from the memories. Furthermore, a node may include one or more caches external to the processors. Since the processors and/or nodes may be storing cache blocks accessed by other nodes, a mechanism for maintaining coherency within the nodes is desired.

SUMMARY OF THE INVENTION

The problems outlined above are in large part solved by a computer system as described herein. The computer system may include multiple processing nodes, one or more of which may be coupled to separate memories which may form a distributed memory system. The processing nodes may include caches, and the computer system may maintain coherency between the caches and the distributed memory system. Particularly, the computer system may implement a flexible probe command/response routing scheme.

In one embodiment, the scheme employs an indication within the probe command which identifies a receiving node to receive the probe responses. Generally, the probe command is a request to a node to determine if a cache block is stored in that node and an indication of the actions to be taken by that node if the cache block is stored in that node. The probe response indicates that the actions have been taken, and may include a transmission of data if the cache block has been modified by the node. By providing the flexibility to route the probe responses to different receiving nodes depending upon the command sent, the maintenance of coherency may be performed in a relatively efficient manner (e.g. using the fewest number of packet transmissions between processing nodes) while still ensuring that coherency is maintained.

For example, probe commands indicating that the target or the source of transaction should receive probe responses corresponding to the transaction may be included. Probe commands may specify the source of the transaction as the receiving node for read transactions (such that dirty data is delivered to the source node from the node storing the dirty data). On the other hand, for write transactions (in which data is being updated in memory at the target node of the transaction), the probe commands may specify the target of the transaction as the receiving node. In this manner, the target may determine when to commit the write data to memory and may receive any dirty data to be merged with the write data.

Broadly speaking, a computer system is contemplated. The computer system may comprise a first processing node and a second processing node. The first processing node may be configured to initiate a transaction by transmitting a request. Coupled to receive the request from the first processing node, the second processing node may be configured to generate a probe in response to the request. The probe includes an indication which designates a receiving node to receive responses to the probe. Additionally, the second processing node may be configured to generate the indication responsive to a type of the transaction.

A method for maintaining coherency in a computer system is also contemplated. A request from a source node is transmitted to a target node. A probe is generated in the target node responsive to the request. A receiving node is designated for responses to the probe via an indication within the probe. A probe response to the probe is routed to the receiving node.

BRIEF DESCRIPTION OF THE DRAWINGS

Other objects and advantages of the invention will become apparent upon reading the following detailed description and upon reference to the accompanying drawings in which:

FIG. 3 is a block diagram of one embodiment of an information packet.

FIG. 4 is a block diagram of one embodiment of an address packet.

FIG. 5 is a block diagram of one embodiment of a response packet.

FIG. 6 is a block diagram of one embodiment of a data packet.

FIG. 7 is table illustrating exemplary packet types with may be employed by one embodiment of a computer system.

FIG. 8 is a block diagram of one embodiment of a probe packet.

FIG. 9 is a block diagram of one embodiment of a probe response packet.

Figure 1:
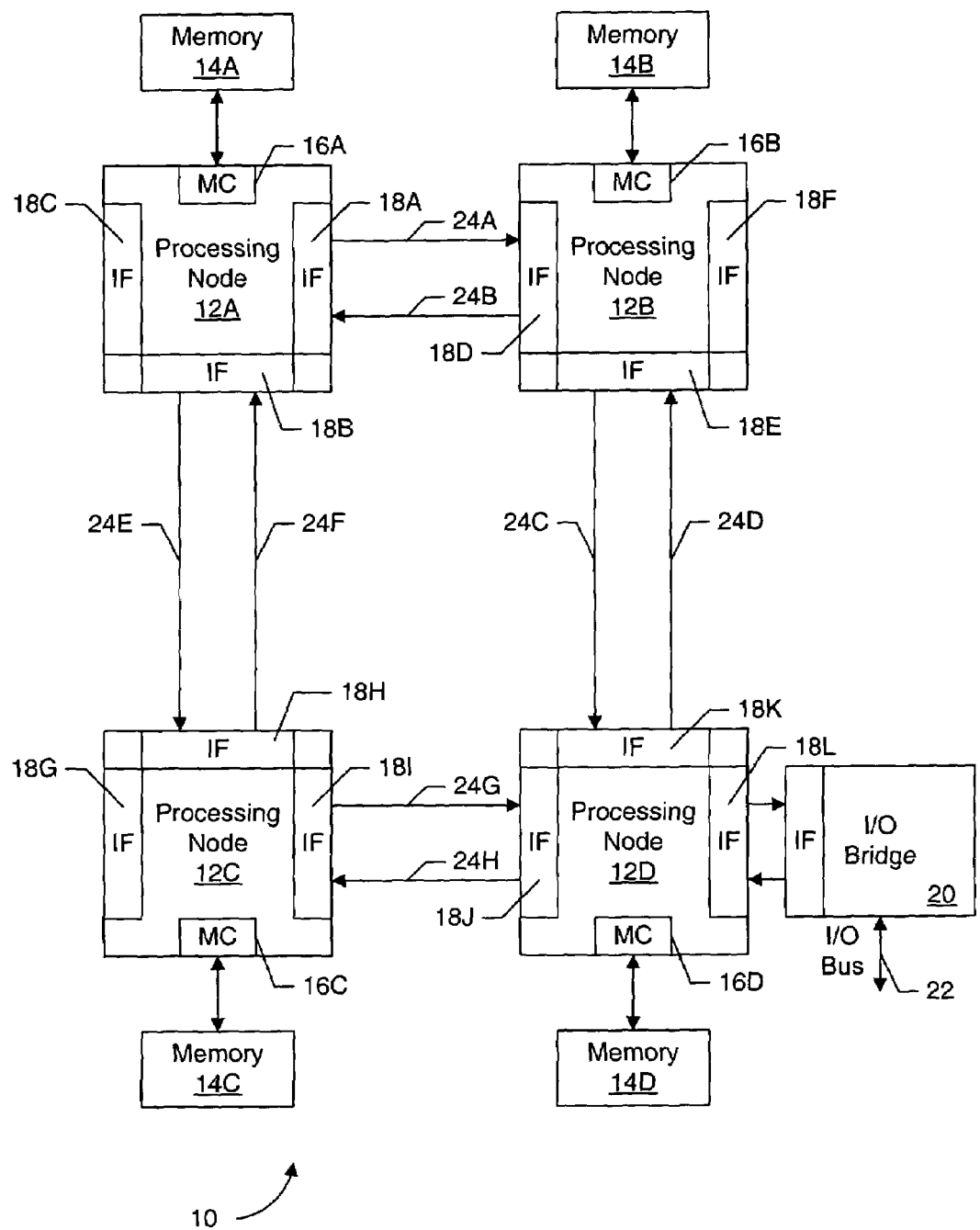
FIG. 1 is a block diagram of one embodiment of a computer system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Exemplary Computer System Embodiment

Turning now to FIG. 1, one embodiment of a computer system 10 is shown. Other embodiments are possible and contemplated. In the embodiment of FIG. 1, computer system 10 includes several processing nodes 12A, 12B, 12C, and 12D. Each processing node is coupled to a respective memory 14A-14D via a memory controller 16A-16D included within each respective processing node 12A-12D. Additionally, processing nodes 12A-12D include interface logic used to communicate between the processing nodes 12A-12D. For example, processing node 12A includes interface logic 18A for communicating with processing node 12B, interface logic 18B for communicating with processing node 12C, and a third interface logic 18C for communicating with yet another processing node (not shown). Similarly, processing node 12B includes interface logic 18D, 18E, and 18F; processing node 12C includes interface logic 18G, 18H, and 18I; and processing node 12D includes interface logic 18J, 18K, and 18L. Processing node 12D is coupled to communicate with an I/O bridge 20 via interface logic 118L.

Other processing nodes may communicate with other I/O bridges in a similar fashion. I/O bridge 20 is coupled to an I/O bus 22.

Processing nodes 12A-12D implement a packet-based link for inter-processing node communication. In the present embodiment, the link is implemented as sets of unidirectional lines (e.g. lines 24A are used to transmit packets from processing node 12A to processing node 12B and lines 24B are used to transmit packets from processing node 12B to processing node 12A). Other sets of lines 24C-24H are used to transmit packets between other processing nodes as illustrated in FIG. 1. The link may be operated in a cache coherent fashion for communication between processing nodes or in a noncoherent fashion for communication between a processing node and an I/O bridge. It is noted that a packet to be transmitted from one processing node to another may pass through one or more intermediate nodes. For example, a packet transmitted by processing node 12A to processing node 12D may pass through either processing node 12B or processing node 12C as shown in FIG. 1. Any suitable routing algorithm may be used. Other embodiments of computer system 10 may include more or fewer processing nodes then the embodiment shown in FIG. 1.

Processing nodes 12A-12D, in addition to a memory controller and interface logic, may include one or more processors. Broadly speaking, a processing node comprises at least one processor and may optionally include a memory controller for communicating with a memory and other logic as desired. The term "node" may be used in the present disclosure as well. The term node is intended to mean "processing node".

Memories 14A-14D may comprise any suitable memory devices. For example, a memory 14A-14D may comprise one or more RAMBUS DRAMs (RDRAMs), synchronous DRAMs (SDRAMs), static RAM, etc. The address space of computer system 10 is divided among memories 14A-14D. Each processing node 12A-12D may include a memory map used to determine which addresses are mapped to which memories 14A-14D, and hence to which processing node 12A-12D a memory request for a particular address should be routed. In one embodiment, the coherency point for an address within computer system 10 is the memory controller 16A-16D coupled to the memory storing bytes corresponding to the address. In other words, the memory controller 16A-16D is responsible for ensuring that each memory access to the corresponding memory 14A-14D occurs in a cache coherent fashion. Memory controllers 16A-16D may comprise control circuitry for interfacing to memories 14A-14D. Additionally, memory controllers 16A-16D may include request queues for queuing memory requests.

Generally, interface logic 18A-18L may comprise a variety of buffers for receiving packets from the link and for buffering packets to be transmitted upon the link. Computer system 10 may employ any suitable flow control mechanism for transmitting packets. For example, in one embodiment, each interface logic 18 stores a count of the number of each type of buffer within the receiver at the other end of the link to which that interface logic is connected. The interface logic does not transmit a packet unless the receiving interface logic has a free buffer to store the packet. As a receiving buffer is freed by routing a packet onward, the receiving interface logic transmits a message to the sending interface logic to indicate that the buffer has been freed. Such a mechanism may be referred to as a "coupon-based" system.

Figure 2:
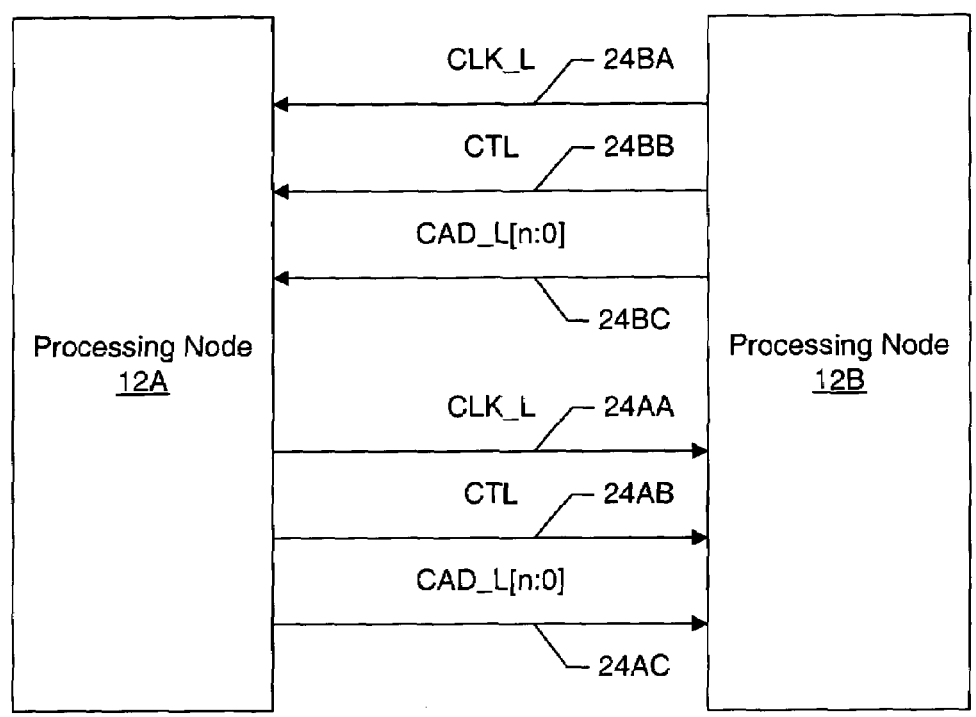
FIG. 2 is a block diagram of a pair of processing nodes shown in FIG. 1, highlighting one embodiment of interconnect therebetween.

Turning next to FIG. 2, a block diagram illustrating processing nodes 12A and 12B is shown to illustrate one embodiment of the links therebetween in more detail. Other embodiments are possible and contemplated. In the embodiment of FIG. 2, lines 24A include a clock line 24AA, a control line 24AB, and a control/address/data bus 24AC. Similarly, lines 24B include a clock line 24BA, a control line 24BB, and a control/address/data bus 24BC.

The clock line transmits a clock signal which indicates a sample point for the control line and the control/address/data bus. In one particular embodiment, data/control bits are transmitted on each edge (i.e. rising edge and falling edge) of the clock signal. Accordingly, two data bits per line may be transmitted per clock cycle. The amount of time employed to transmit one bit per line is referred to herein as a "bit time". The above-mentioned embodiment includes two bit times per clock cycle. A packet may be transmitted across two or more bit times. Multiple clock lines may be used depending upon the width of the control/address/data bus. For example, two clock lines may be used for a 32 bit control/address/data bus (with one half of the control/address/data bus referenced to one of the clock lines and the other half of the control/address/data bus and the control line referenced to the other one of the clock lines. Generally speaking, a "packet" is a communication between two processing nodes 12A-12D. One or more packets may form a "transaction", which is a transfer of information from one processing node to another. The packets forming a transaction may include a request packet which initiates a transaction from a source node (the initiating node requesting the transfer) to a target node (the node to which the transaction is directed), packets transmitted between other processing nodes to maintain coherency, data packets, and acknowledgement packets which terminate the transaction.

The control line indicates whether or not the data transmitted upon the control/address/data bus is either a bit time of a control packet or a bit time of a data packet. The control line is asserted to indicate a control packet, and deasserted to indicate a data packet. Certain control packets indicate that a data packet follows. The data packet may immediately follow the corresponding control packet. In one embodiment, other control packets may interrupt the transmission of a data packet. Such an interruption may be performed by asserting the control line for a number of bit times during transmission of the data packet and transmitting the bit times of the control packet while the control line is asserted. Control packets which interrupt a data packet may not indicate that a data packet will be following.

The control/address/data bus comprises a set of lines for transmitting the data/control bits. In one embodiment, the control address/data bus may comprise 8, 16, or 32 lines. Each processing node or I/O bridge may employ any one of the supported numbers of lines according to design choice. Other embodiments may support other sizes of control/address/data bus as desired.

According to one embodiment, the command/address/data bus lines and the clock line may carry inverted data (i.e. a logical one is represented as a low voltage on the line, and a logical zero is represented as a high voltage). Alternatively, lines may carry non-inverted data (in which a logical one is represented as a high voltage on the line, and logical zero is represented as a low voltage).

Turning now to FIGS. 3-6, exemplary packets employed according to one embodiment of computer system 10 are shown. FIGS. 3-5 illustrate control packets and FIG. 6 illustrates a data packet. Other embodiments may employ different packet definitions, as desired. Each of the packets are illustrated as a series of bit times enumerated under the "bit time" heading. The bit times of the packet are transmitted according to the bit time order listed. FIGS. 3-6 illustrate packets for an eight bit control/address/data bus implementation. Accordingly, each bit time comprises eight bits numbered seven through zero. Bits for which no value is provided in the figures may either be reserved for a given packet, or may be used to transmit packet-specific information.

FIG. 3 illustrates an information packet (info packet) 30. Info packet 30 comprises two bit times on an eight bit link. The command encoding is transmitted during bit time one, and comprises six bits in the present embodiment. Each of the other control packets shown in FIGS. 4 and 5 include the command encoding in the same bit positions during bit time 1. Info packet 30 may be used to transmit messages between processing nodes when the messages do not include a memory address.

FIG. 4 illustrates an address packet 32. Address packet 32 comprises eight bit times on an eight bit link. The command encoding is transmitted during bit time 1, along with a portion of the destination node number. The remainder of the destination node number and the source node number are transmitted during bit time two. A node number unambiguously identifies one of the processing nodes 12A-12D within computer system 10, and is used to route the packet through computer system 10. Additionally, the source of the packet may assign a source tag transmitted during bit times 2 and 3. The source tag identifies packets corresponding to a particular transaction initiated by the source node (i.e. each packet corresponding to a particular transaction includes the same source tag). Bit times four through eight are used transmit the memory address affected by the transaction. Address packet 32 may be used to initiate a transaction (e.g. a read or write transaction), as well as to transmit commands in the process of carrying out the transaction for those commands which carry the memory address affected by the transaction.

FIG. 5 illustrates a response packet 34. Response packet 34 includes the command encoding, destination node number, source node number, and source tag similar to the address packet 32. Various types of response packets may include additional information. For example, a read response packet may indicate the amount of read data provided in a following data packet. Probe responses may indicate whether or not a hit was detected for the requested cache block. Generally, response packet 34 is used for commands during the carrying out of a transaction which do not require transmission of the memory address affected by the transaction. Furthermore, response packet 34 may be used to transmit positive acknowledgement packets to terminate a transaction.

FIG. 6 illustrates the data packet 36. Data packet 36 includes eight bit times on an eight bit link in the embodiment of FIG. 6. Data packet 36 may comprise different numbers of bit times dependent upon the amount of data being transferred. For example, in one embodiment a cache block comprises 64 bytes and hence 64 bit times on an eight bit link. Other embodiments may define a cache block to be of a different size, as desired. Additionally, data may be transmitted in less than cache block sizes for non-cacheable reads and writes. Data packets for transmitting data less than cache block size employ fewer bit times.

FIGS. 3-6 illustrate packets for an eight bit link. Packets for 16 and 32 bit links may be formed by concatenating consecutive bit times illustrated in FIGS. 3-6. For example, bit time one of a packet on a 16 bit link may comprise the information transmitted during bit times one and two on the eight bit link. Similarly, bit time one of the packet on a 32 bit link may comprise the information transmitted during bit times one through four on the eight bit link. Formulas 1 and 2 below illustrate the formation of bit time one of a 16 bit link and bit time one of a 32 bit link according to bit times from an eight bit link.

$$BT1_{16}[15:0]=BT2_8[7:0]\|BT1_8[7:0] \quad (1)$$

$$BT1_{32}[31:0]=BT4_8[7:0]\|BT3_8[7:0]BT2_8[7:0]\|BT1_8[7:0] \quad (2)$$

Turning now to FIG. 7, a table 38 is shown illustrating commands employed according to one exemplary embodiment of the link within computer system 10. Other embodiments are possible and contemplated. Table 38 includes a command code column illustrating the command encodings assigned to each command, a command column naming the command, and a packet type column indicating which of command packets 30-34 is employed for that command.

A read transaction is initiated using one of the ReadSized, RdBlk, RdBlkS or RdBlkMod commands. The ReadSized command is used for non-cacheable reads or reads of data other than a cache block in size. The amount of data to be read is encoded into the ReadSized command packet. For reads of a cache block, the RdBlk command may be used unless: (i) a writeable copy of the cache block is desired, in which case the RdBlkMod command may be used; or (ii) a copy of the cache block is desired but no intention to modify the block is known, in which case the RdBlkS command may be used. The RdBlkS command may be used to make certain types of coherency schemes (e.g. directory-based coherency schemes) more efficient. In general, the appropriate read command is transmitted from the source initiating the transaction to a target node which owns the memory corresponding to the cache block. The memory controller in the target node transmits Probe/Src commands to the other nodes in the system to maintain coherency by changing the state of the cache block in those nodes and by causing a node including an updated copy of the cache block to send the cache block to the source node. Each node receiving a Probe/Src command transmits a ProbeResp packet to the source node. If a probed node has an updated copy of the read data (i.e. dirty data), that node transmits a RdResponse packet and the dirty data. A node transmitting dirty data may also transmit a MemCancel packet to the target node in an attempt to cancel transmission by the target node of the requested read data. Additionally, the memory controller in the target node transmits the requested read data using a RdResponse packet followed by the data in a data packet. If the source node receives a RdResponse packet from a probed node, that read data is used. Otherwise, the data from the target node is used. Once each of the probe responses and the read data is received in the source node, the source node transmits a SrcDone response packet to the target node as a positive acknowledgement of the termination of the transaction.

A write transaction is initiated using a WrSized or VicBlk command followed by a corresponding data packet. The WrSized command is used for non-cacheable writes or writes of data other than a cache block in size. To maintain coherency for WrSized commands, the memory controller in the target node transmits Probe/Tgt commands to each of the other nodes in the system. In response to Probe/Tgt commands, each probed node transmits a ProbeResp packet to the target node. If a probed node is storing dirty data, the probed node responds with a RdResponse packet and the dirty data. In this manner, a cache block updated by the WrSized command is returned to the memory controller for merging with the data provided by the WrSized command.

The memory controller, upon receiving probe responses from each of the probed nodes, transmits a TgtDone packet to the source node to provide a positive acknowledgement of the termination of the transaction. The source node replies with a SrcDone response packet.

A victim cache block which has been modified by a node and is being replaced in a cache within the node is transmitted back to memory using the VicBlk command. Probes are not needed for the VicBlk command. Accordingly, when the target memory controller is prepared to commit victim block data to memory, the target memory controller transmits a TgtDone packet to the source node of the victim block. The source node replies with either a SrcDone packet to indicate that the data should be committed or a MemCancel packet to indicate that the data has been invalidated between transmission of the VicBlk command and receipt of the TgtDone packet (e.g. in response to an intervening probe).

The ChangetoDirty packet may be transmitted by a source node in order to obtain write permission for a cache block stored by the source node in a non-writeable state. A transaction initiated with a ChangetoDirty command may operate similar to a read except that the target node does not return data The ValidateBlk command may be used to obtain write permission to a cache block not stored by a source node if the source node intends to update the entire cache block. No data is transferred to the source node for such a transaction, but otherwise operates similar to a read transaction.

The InterruptBroadcast, Interrupt Target, and IntrResponse packets may be used to broadcast interrupts, to send an interrupt to a particular target node, and to respond to interrupts, respectively. The CleanVicBlk command may be used to inform a memory controller that a clean victim block has been discarded from a node (e.g. for directory based coherency schemes). The TgtStart command may be used by a target to indicate that a transaction has been started (e.g. for ordering of subsequent transactions). The Error command is used to transmit an error indication.

Probe/Probe Response Routing Turning now to FIG. 8, a block diagram of one embodiment of a probe packet 40 is shown. Other embodiments organizing probe packets in different manners and having alternative, similar, or substitute information are possible and contemplated. Probe packet 40 is one type of address packet 32 shown in FIG. 4. As shown in FIG. 8, Probe packet 40 includes a command field (CMD[5:0] in FIG. 8), a target node field (TgtNode[1:0] and TgtNode [3:2] in FIG. 8), a source node field (SrcNode[3:0] in FIG. 8), a source tag field (SrcTag[0:0] and SrcTag[6:2] in FIG. 8), a data movement field (DM in FIG. 8), a next state field (NextState[0:0] in FIG. 8), and an address field (Addr[39:0] across bit times 4-8 in FIG. 8).

The command field is encoded to identify packet 40 as a probe packet. For example, the encodings for Probe/Src and Probe/Tgt shown in FIG. 7 may be used. Generally speaking, the target node of a transaction generates probe commands to maintain coherency of the cache block affected by the transaction. One of the set of probe commands is selected by the target node, based upon the type of transaction being initiated. The selected probe command identifies a receiving node for responses to the probe commands. By providing the flexibility to route probe responses to one of multiple possible receiving nodes, (as opposed to routing probe responses to a predetermined receiving node), coherency maintenance may be performed in a manner which is efficient (e.g. in terms of number of packets transmitted between nodes) and which leads to a correct result.

For example, transactions which result in the transfer of a cache block to the source node of the transaction may maintain coherency by directing probe responses (including responses which transfer data) to the source node. The source node may await the responses from each of the other nodes (the probed nodes) and the response from the target node, and then establish the transferred cache block within the node and transmit an acknowledgement packet to the target node to terminate the transaction. By awaiting probe responses from the probed nodes before terminating the transaction, each node may established the correct coherency state for that transaction prior to termination. On the other hand, a WrSized transaction (which may update less than a cache block) is initiated by transmitting a WrSized command and the corresponding data to the target node. Since the target node commits the data to memory at the target node, the target node may receive the probe responses instead of the source node. Particularly, if the cache block including the bytes being updated by the WrSized transaction is dirty in a probed node, the target node may receive the dirty data in a response to the probe and may merge the data with the data corresponding to the WrSized command. Once the probe responses are received, a coherency state dictated by the write operation is established in the probed nodes and the write data may be committed to memory. Accordingly, in the present embodiment, two types of probe commands are supported to indicate to probed nodes which node is to receive the probe response (e.g. source or target node). Other embodiments may support additional probe commands indicating additional receiving nodes, as desired.

In one exemplary embodiment, the memory controller within the target node may select a transaction from its queues of requests to be processed, and may generate a probe command in response to that selection. The probe command may be broadcast to the probed nodes within the computer system. The command field indicates whether the probe response should be routed to the target node or the source node. For example, as illustrated in table 38 shown in FIG. 7, bit 0 of the command field may indicate the receiving node (with a binary zero indicating source node and a binary one indicating target node). The target node field identifies the target node of the transaction, and the source node field identifies the source node of the transaction. It is noted that the probe command may be broadcast to caches within the target node as well, and the target node may provide a probe response. In other words, the target node may be a probed node as well.

Additionally, the data movement field (e.g. a bit, in one embodiment) may be used to indicate if data is to be returned in a response to the probe in the event that the cache block is dirty in the probed node. If the data movement field indicates no movement (e.g. in a clear state), a node with dirty data returns a probe response to the designated receiving node and does not transmit the dirty data to the receiving node. If the data movement field indicates movement (e.g. in a set state), a node with dirty data returns a read response to the source node including the dirty data. The next state field indicates what the next state of the cache block is to be in the probed node (if the probed node is storing a copy of the cache block). In one embodiment, the encoding of the next state field is as illustrated in Table 1 below:

TABLE 1

Next State Field Encoding

| Encoding | Meaning |
|---|---|
| 00 | No Change |
| 01 | Shared: |
|  | Clean -> Shared |
|  | Dirty -> Shared/Dirty |
| 10 | Invalid |
| 11 | Reserved |

According to one embodiment, table 2 below illustrates exemplary transaction types and the corresponding probe commands:

TABLE 2

Transaction Types and Probe Commands

| Transaction Type | Probe Command | Next State | Data Movement |
|---|---|---|---|
| ReadSized | Probe/Src | No Change(00) | Y(1) |
| Block Reads | Probe/Src | Shared(01) | Y(1) |
| ChangetoDirty | Probe/Src | Invalid(10) | Y(1) |
| ValidateBlk | Probe/Src | Invalid(10) | N(0) |
| WrSized | Probe/Tgt | Invalid(10) | Y(1) |
| VicBlk | None | — | — |

Generally speaking, the term "probe" or "probe command" refers to a request for the probed node to determine if a cache block defined by the probe (e.g. via the address field) is stored by the probed node and to indicate the desired response from the probed node. The response may include establishing a different coherency state for the cache block and/or may include transferring the cache block to the receiving node. The probed node responds to a probe using a "probe response", which positively acknowledges to the receiving node that the desired coherency state change has been made. The probe response may include data if the probed node is storing dirty data.

Turning now to FIG. 9, a block diagram of one embodiment of a probe response packet 42 is shown. Other embodiments organizing probe response packets in different manners and having alternative, similar, or substitute information are possible and contemplated. Probe response packet 42 is one type of response packet 34 shown in FIG. 5. Similar to the probe packet shown in FIG. 8, probe response packet 42 includes a command field (CMD[5:0]), a source node field (SrcNode[3:0]), and a source tag field (SrcTag[1:0] and SrcTag[6:2]). Additionally, probe response packet 42 includes a response node field (RespNode[3:2] and RespNode[1:0] in FIG. 9) and a hit indication (Hit in FIG. 9).

A probed node searches its caches for the cache block identified by the address received in the probe packet 40. If a copy of the cache block is found, the probed node changes the state of the cache block as defined in the next state field. Additionally, if the caches are storing a dirty copy of the cache block and the data movement field of probe packet 40 indicates that the cache block is to be transferred, the probed node reads the dirty data from the caches.

The probed node routes a probe response packet 42 to the designated receiving node in the cases of: (i) no dirty data; or (ii) dirty data and the data movement field indicates no movement. More particularly in the present embodiment, the probed node may read either the target node field of probe packet 40 (if the designated receiving node is the target node) or the source node field of probe packet 40 (if the designated receiving node is the source node) and store the resulting node ID into the response node field of probe response packet 42. Additionally, the hit indication is used to indicate if the probed node is retaining a copy of the cache block. For example, the hit indication may comprise a bit indicating, when set, that the probed node is retaining a copy of the cache block and indicating, when clear, that the probed node is not retaining a copy of the cache block. The hit bit may be clear if: (i) a copy of the cache block was not found in caches within the probed node; or (ii) a copy of the cache block was found in the caches within the probed node but was invalidated in response to the probe command.

In one embodiment illustrated in table 38 of FIG. 7, the command field of probe response packet 42 may indicate ProbResp, and may further indicate whether the probe response is a response to a Probe/Src command or a Probe/Tgt command. More particularly, bit zero of the command field may be clear to indicate that the probe response is a response to a Probe/Src command and set to indicate that the probe response is a response to a Probe/Tgt command. This indication may be used by the receiving node to determine if the probe response is to be routed to the memory controller within the receiving node (bit zero set) or to the fill receive logic for the caches within the receiving node (bit zero clear).

Figures 10, 11:
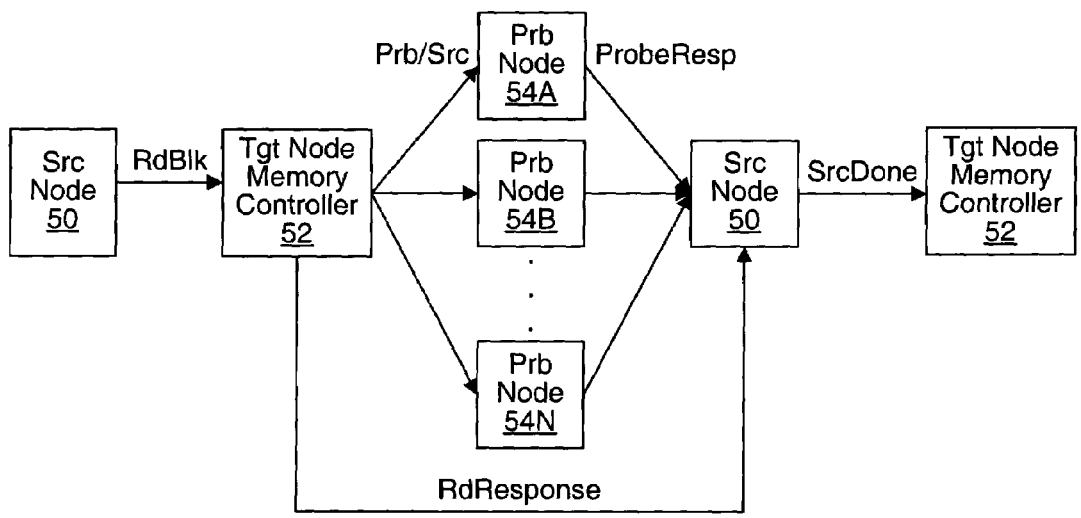
FIG. 10 is a block diagram of one embodiment of a read response packet.
FIG. 11 is a diagram illustrating an example flow of packets corresponding to a read block transaction.

Turning next to FIG. 10, a block diagram of one embodiment of a read response packet 44 is shown. Other embodiments organizing read response packets in different manners and having alternative, similar, or substitute information are possible and contemplated. Read response packet 44 is one type of response packet 34 shown in FIG. 5. Similar to the probe response packet shown in FIG. 9, read response packet 44 includes a command field (CMD[5:0]), a source node field (SrcNode[3:0]), a source tag field (SrcTag[1:0] and SrcTag[6:2]), and a response node field (RespNode[3:2] and RespNode[1:0]). Additionally, read response packet 44 includes a count field (Count in FIG. 10), a type field (Type in FIG. 10) and a probe field (Prb in Fi. 10).

A probed node which detects a hit on dirty data for a probe command which indicates that data movement is requested may use the read response packet 44 to transmit a probe response and the dirty data. The count field is used to indicate the amount of data being transmitted, and the type field indicates whether the count is measured in bytes or quadwords (eight bytes). For cache block transfers in response to a probe, the count field indicates eight (encoded as binary '111') and the type field indicates quadword (e.g. a set bit in the type field, in one embodiment). The probe field is used to indicate that read response packet 44 is transmitted from either the target node or a probed node. For example, the probe field may comprise a bit indicating, when set, that read response packet 44 is transmitted from a probed node and indicating, when clear, that read response packet 44 is transmitted from the target node. Accordingly, a probed node sets the probe bit when using read response packet 44.

Read response packet 44 is a packet type which indicates that a data packet follows. Accordingly, the probed node transmits the cache block in a data packet subsequent to read response packet 44. The probed node routes read response packet 44 in a manner similar to the routing of probe response packet 42 described above (e.g., the probed node may read either the target node field of probe packet 40 (if the designated receiving node is the target node) or the source node field of probe packet 40 (if the designated receiving node is the source node) and store the resulting node ID into the response node field of read response packet 44).

In one embodiment illustrated in table 38 of FIG. 7, the command field of read response packet 44 may indicate RdResponse, and may further indicate whether the read response is a response to a Probe/Src command or a Probe/Tgt command. More particularly, bit zero of the command field may be clear to indicate that the read response is a response to a Probe/Src command and set to indicate that the read response is a response to a Probe/Tgt command. This indication may be used by the receiving node to determine if the read response is to be routed to the memory controller within the receiving node (bit zero set) or to the fill receive logic for the caches within the receiving node (bit zero clear).

Turning now to FIG. 11, a diagram is shown illustrating the flow of packets between a set of nodes corresponding to an exemplary read block transaction. A source node 50, a target node memory controller 52, and a set of probed nodes 54A-54N are shown. The order (in time) of packets is illustrated from left to right in FIG. 11. In other words, a RdBlk packet is transmitted from source node 50 to target node memory controller 52 before target node memory controller 52 transmits probe/src packets to probe nodes 54A-54N, etc. In order to illustrate the time order of packets, source node 50 and target memory controller 52 are illustrated twice in FIG. 11. Similarly, certain blocks may be illustrated more than once in FIGS. 12 and 13 below. Source node 50, the target node including target node memory controller 52, and probed nodes 54A-54N each may comprise processing nodes similar to processing nodes 12A-12D shown in FIG. 1.

Source node 50 transmits a RdBlk packet to target node memory controller 52 to initiate the read block transaction. Target node memory controller 52 subsequently selects the RdBlk packet to be serviced. Target node memory controller 52 generates Probe/Src packets and broadcasts the packets to the probed nodes 54A-54N. Additionally, target node memory controller 52 initiates a read from the memory 14A-14D to which target node memory controller 52 is coupled. Upon completing the read from the memory 14A-14D, target node memory controller 52 generates a RdResponse packet including the data and transmits the packet to source node 50.

Each of probed nodes 54A-54N searches its caches to determine if the cache block read by the RdBlk packet is stored therein. If a hit is detected, the corresponding probed node 54A-54N updates the state of the cache block according to the next state field in the probe packet received from target node memory controller 52. Additionally, each probed node 54A-54N routes a ProbeResp packet to source node 50 (since Probe/Src packets were received). In the present example, no probed node 54A-54N is storing a dirty copy of the cache block.

Source node 50 awaits ProbeResp packets from probed nodes 54A-54N and the RdResponse packet from target memory controller 52. Once these packets have been received, source node 50 transmits a SrcDone packet to target memory controller 52, terminating the transaction.

Figure 12:
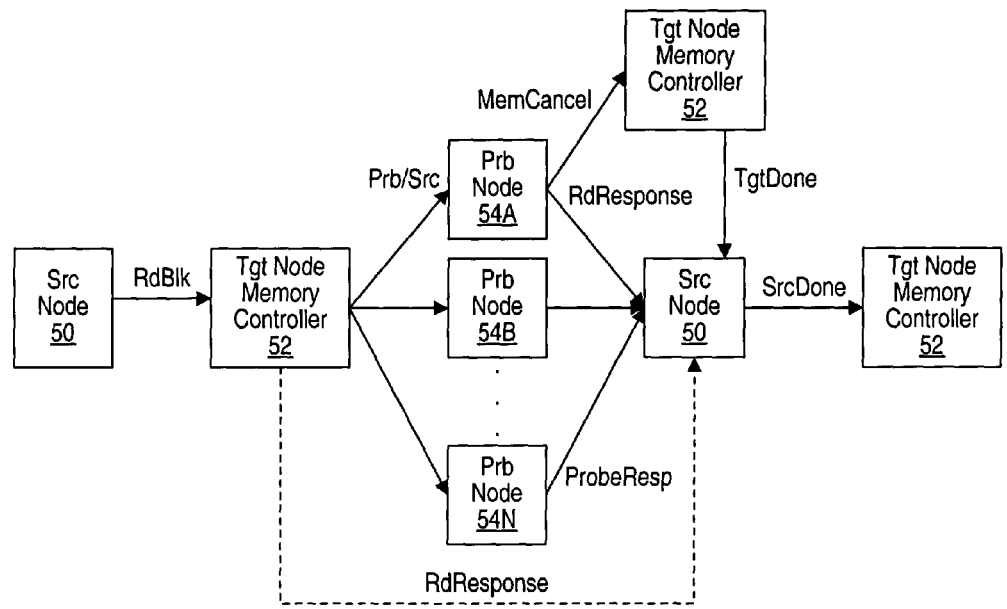
FIG. 12 is a diagram illustrating a second example flow of packets corresponding to a read block transaction.

Turning next to FIG. 12, a diagram is shown illustrating a second exemplary read block transaction. Source node 50, target node memory controller 52, and probed nodes 54A-54N are shown. Source node 50, the target node including target node memory controller 52, and probed nodes 54A-54N each may comprise processing nodes similar to processing nodes 12A-12D shown in FIG. 1.

Similar to the example shown in FIG. 11, source node 50 transmits a RdBlk packet to target node memory controller 52. Target node memory controller 52 transmits Probe/Src packets to probed nodes 54A-54N, and may transmit a RdResponse packet to source node 50.

In the example of FIG. 12, probed node 54A detects dirty data for the cache block accessed by the read block transaction. Accordingly, probed node 54A transmits a RdResponse packet to source node 50 (as directed by the Probe/Src command) along with the dirty cache block read from a cache internal to probed node 54A. Additionally, in one embodiment, probed node 54A may transmit a MemCancel packet to target node memory controller 52. If the MemCancel packet reaches target node memory controller 52 prior to target node memory controller 52 transmitting the RdResponse packet to source node 50, target node memory controller 52 does not transmit the RdResponse packet. Hence, the line from target node memory controller 52 to source node 50 labeled "RdResponse" is dotted to indicate its optional nature. In response to the MemCancel Message, target node memory controller 52 transmits a TgtDone packet to source node 50. 5 Probed nodes 54B-54N do not detect dirty data in the present example, and hence route ProbeResp packets to source node 50. Once source node 50 has received the TgtDone, RdResponse, and ProbeResp packets, source node 50 transmits the SrcDone packet to target memory controller 52 to terminate the read block transaction.

Figure 13:
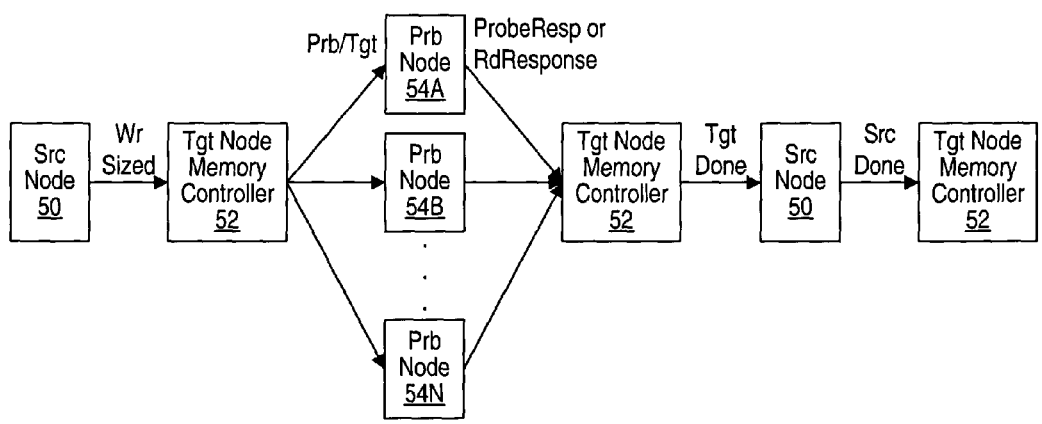
FIG. 13 is a diagram illustrating an example flow of packets corresponding to a sized write transaction.

Turning now to FIG. 13, a diagram is shown illustrating an exemplary sized write transaction. Source node 50, target node memory controller 52, and probed nodes 54A-54N are shown. Source node 50, the target node including target node memory controller 52, and probed nodes 54A-54N each may comprise processing nodes similar to processing nodes 12A-12D shown in FIG. 1.

Source node 50 initiates the sized write transaction by transmitting a WrSized packet and the data to be written to target node memory controller 52. Since the sized write transaction may update a portion of a cache block while not updating the remaining portion of the cache block, target node memory controller 52 collects the dirty cache block (if one exists) from probed nodes 54A-54N. Additionally, clean copies of the cache block are invalidated in probed nodes 54A-54N to maintain coherency. Target memory controller 52, upon selecting the sized write transaction to be serviced, transmits Probe/Tgt packets to probed nodes 54A-54N. Probed nodes 54A-54N return either ProbeResp packets (if no dirty data is detected) or RdResponse packets (if dirty data is detected) to target node memory controller 54 (since Probe/Tgt packets were received). Once target node memory controller 52 has received responses from the probed nodes 54A-54N, target node memory controller 52 transmits a TgtDone packet to source node 50, which responds with a SrcDone packet terminating the sized write transaction.

If target node memory controller 52 receives a dirty cache block from one of probed nodes 54A-54N, target node memory controller 52 effects a merge of the dirty cache block and the bytes provided by source node 50 in the WrSized data packet. Any suitable mechanism for effecting the merge may be used. For example, target node memory controller 52 may merge the data and perform a single block write to update the memory. Alternatively, the dirty block may be written to memory first, followed by a write of the bytes provided by source node 50.

It is noted that, while the present description may refer to packets being transmitted between nodes, any suitable mechanism for transmitting commands, responses, and other messages may be used.

Figure 14:
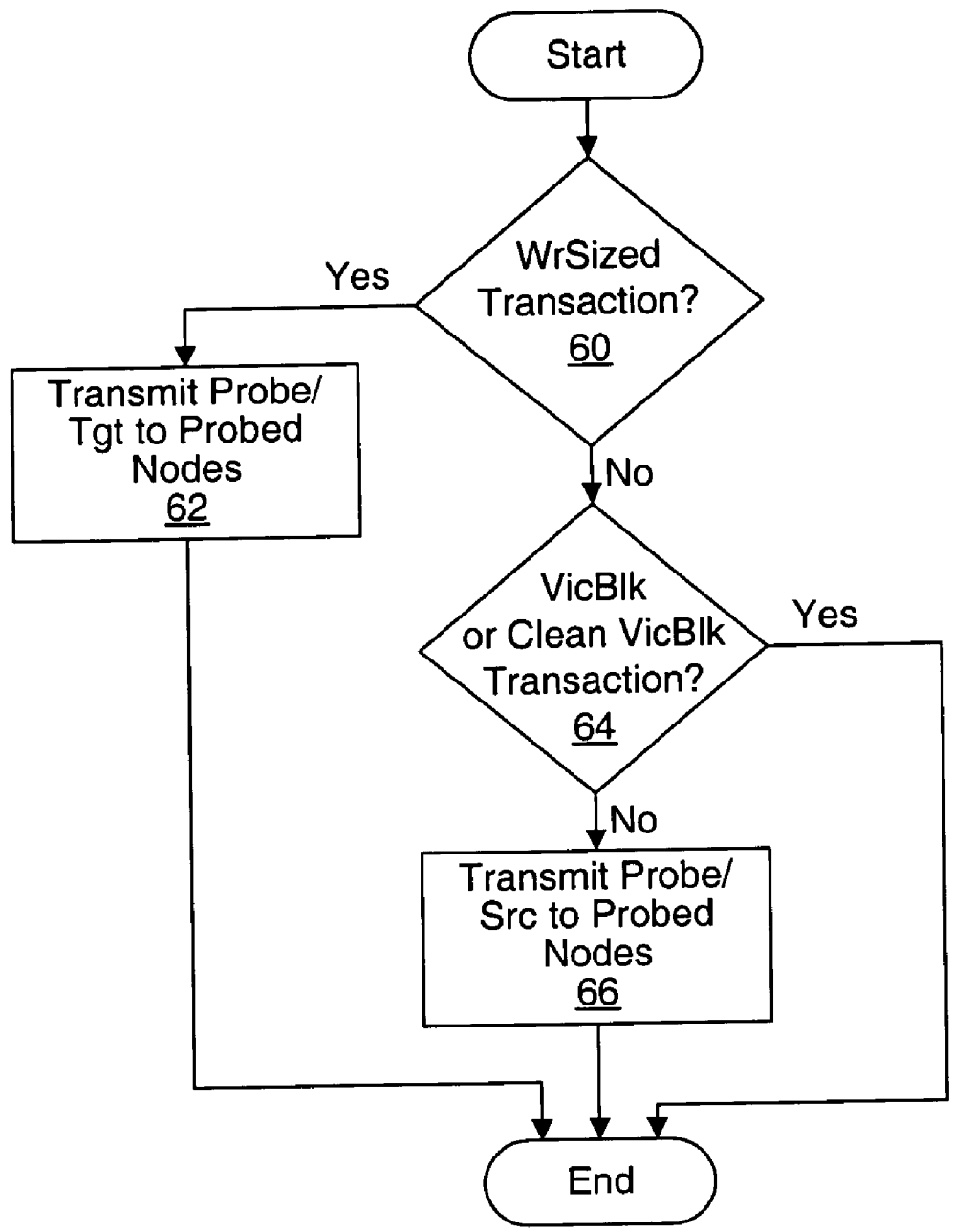
FIG. 14 is a flowchart illustrating operation of one embodiment of a memory controller.

Turning now to FIG. 14, a flowchart is shown illustrating operation of a portion of one embodiment of a memory controller 16A-16D in response to selecting a transaction for service. In particular, the portion of a memory controller 16A-16D which generates probes is shown. Other embodiments are possible and contemplated. While steps are illustrated in a particular order for ease of understanding in FIG. 14, any suitable order may be used. Furthermore, steps may be performed in parallel using parallel hardware within memory controller 16A-16D, as desired according to design choice.

The memory controller determines if the selected transaction is a WrSized transaction (decision block 60). If the selected transaction is a WrSized transaction, the memory controller transmits Probe/Tgt packets to each of the probed nodes (step 62). Otherwise, the memory controller determines if the selected transaction is a VicBlk or CleanVicBlk transaction (decision block 64). If the selected transaction is a VicBlk or CleanVicBlk transaction, no probe packets are generated. On the other hand, if the selected transaction is not WrSized, VicBlk, or CleanVicBlk, Probe/Src packets are transmitted to the probed nodes (step 66).

Figure 15:
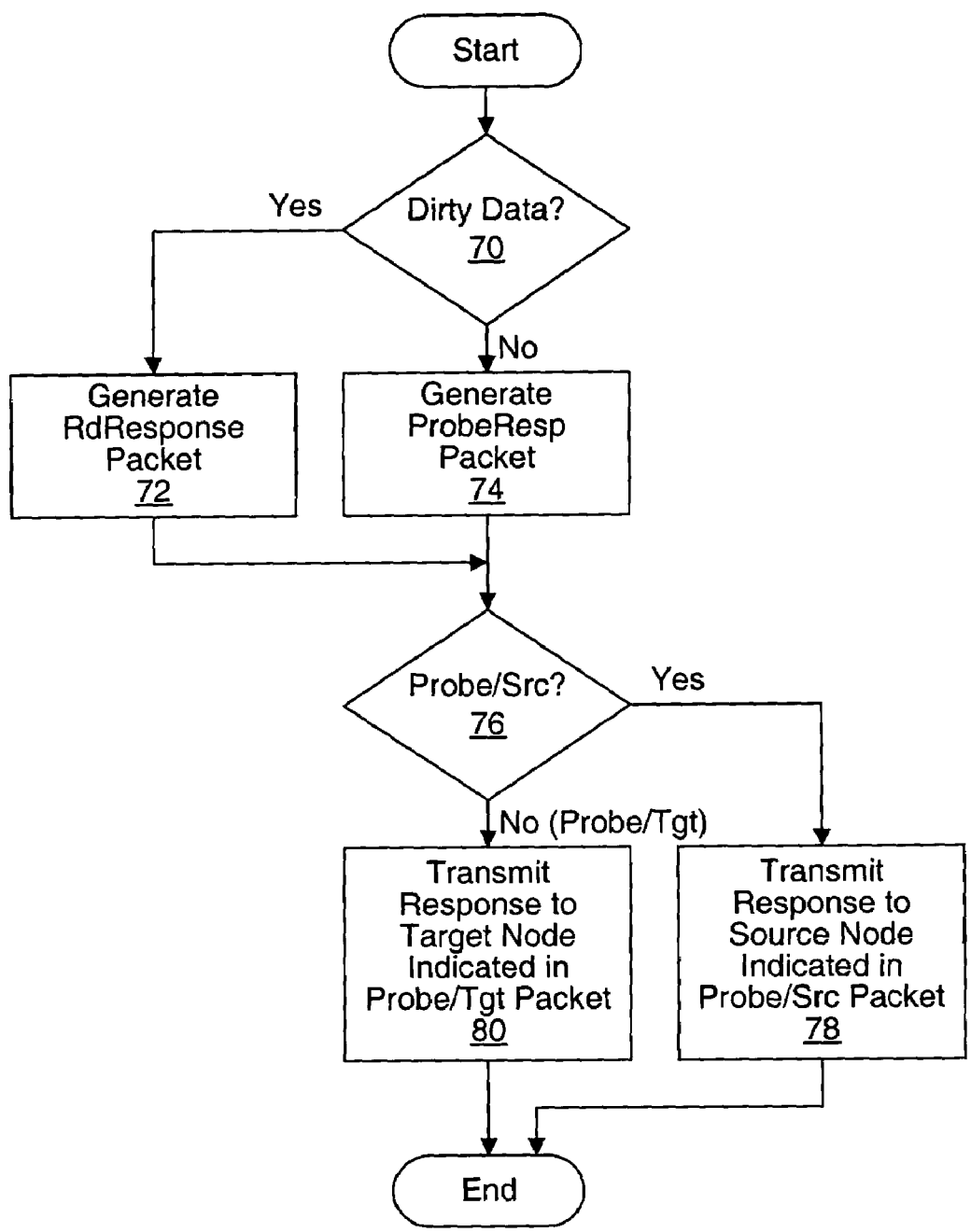
FIG. 15 is a flowchart illustrating operation of one embodiment of a processing node which receives a probe packet.

Turning now to FIG. 15, a flowchart illustrating operation of one embodiment of a probed node in response to a probe packet is shown. Other embodiments are possible and contemplated. While steps are illustrated in a particular order for ease of understanding in FIG. 15, any suitable order may be used. Furthermore, steps may be performed in parallel using parallel hardware within a probed node, as desired according to design choice.

The probed node searches its caches to determine if the cache block indicated by the probe is stored therein, and to determine the state of the cache block if found. If the cache block is found in a dirty state (decision block 70), the probed node generates a RdResponse packet. The probed node reads the dirty data from the cache for transmission in a data packet following the RdResponse packet (step 72). On the other hand, if the cache block is not found or is not in a dirty state, the probed node generates a ProbeResp packet (step 74). Additionally, the state of the cache block is updated as specified in the next state field of the probe packet.

The probed node examines the received probe packet (decision block 76). If the probe packet is a Probe/Src packet, the probed node routes the response generated above to the source node indicated in the Probe/Src packet (step 78). In other words, the probed node sets the RespNode field in the response packet to the value in the SrcNode field of the Probe/Src packet. On the other hand, if the probe packet is a Probe/Tgt packet, the probed node routes the response generated above to the target node indicated in the Probe/Tgt packet (step 80). In other words, the probed node sets the RespNode field in the response packet to the value in the TgtNode field of the Probe/Tgt packet.

Figure 16:
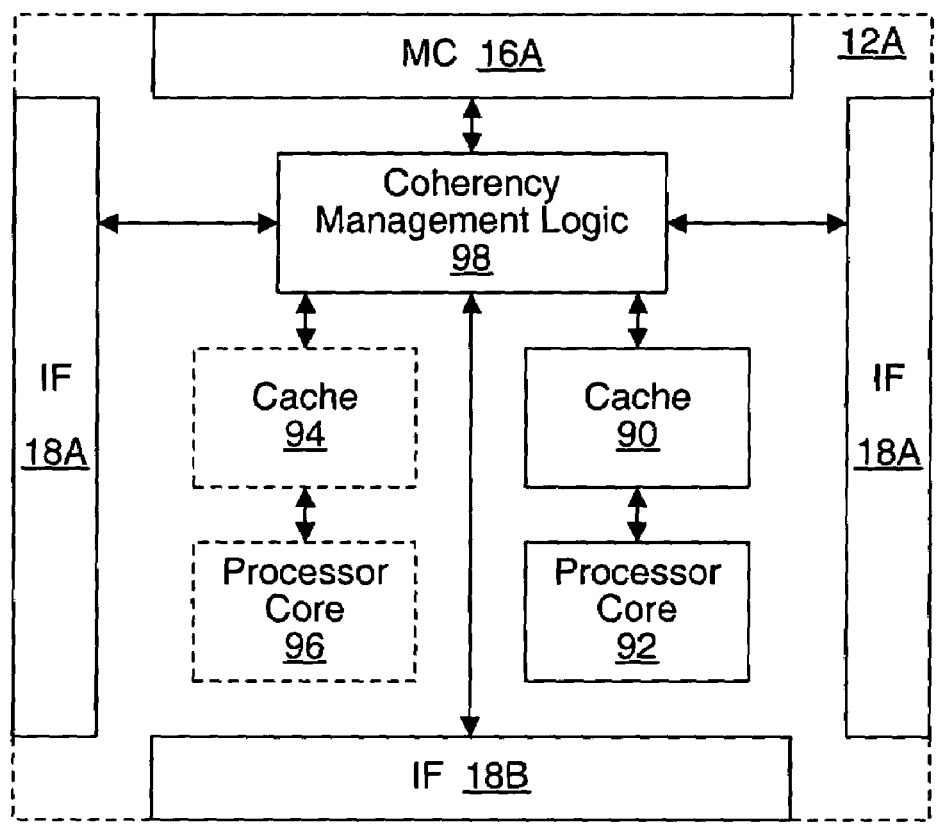
FIG. 16 is a block diagram of one embodiment of a processing node.

Turning now to FIG. 16, a block diagram of one embodiment of an exemplary processing node 12A is shown. Other embodiments are possible and contemplated. In the embodiment of FIG. 16, processing node 12A includes interface logic 18A, 18B, and 18C and memory controller 16A. Additionally, processing node 12A includes a processor core 92 and a cache 90, coherency management logic 98, and may optionally include a second processor core 96 and a second cache 94. Interfaces logics 18A-18C are coupled to each other and to coherency management logic 98. Processor cores 92 and 96 are coupled to caches 90 and 94, respectively. Caches 90 and 94 are coupled to coherency management logic 98. Coherency management logic 98 is coupled to memory controller 16A.

Generally, coherency management logic 98 is configured to generate probe commands in response to transactions selected by memory controller 16A for service as well as to respond to probe commands received by processing node 12A. Coherency management logic 98 broadcasts either a Probe/Src command or a Probe/Tgt command depending upon the type of transaction selected for service. Additionally, coherency management logic 98 searches caches 90 and 94 for a cache block specified by a received probe command and generates the appropriate probe response. Furthermore, in the case of generating a Probe/Tgt command, coherency management logic 98 may collect probe responses returned in response to the Probe/Tgt command. Caches 90 and 94 may include fill logic which manages the receipt of data from a read request initiated within processing node 12A, or the fill logic may be included within coherency management logic 98. Coherency management logic 98 may be further configured to route noncoherent requests to memory controller 16A. In one embodiment, processors 92 and 96 may bypass caches 90 and 94 and coherency management logic 98 to directly access memory controller 16A for certain non-cacheable and/or noncoherent memory requests.

Caches 90 and 94 comprise high speed cache memories configured to store cache blocks of data Caches 90 and 94 may be integrated within respective processor cores 92 and 96. Alternatively, caches 90 and 94 may be coupled to processor cores 92 and 96 in a backside cache configuration or an in-line configuration, as desired. Still further, caches 90 and 94 may be implemented as a hierarchy of caches. Caches which are nearer processor cores 92 and 96 (within the hierarchy) may be integrated into processor cores 92 and 96, if desired.

Processor cores 92 and 96 include the circuitry for executing instructions according to a predefined instruction set. For example, the x86 instruction set architecture may be selected. Alternatively, the Alpha, PowerPC, or any other instruction set architecture may be selected. Generally, the processor cores access the caches for data and instructions. If a cache miss is detected, a read request is generated and transmitted to the memory controller within the node to which the missing cache block is mapped.

It is noted that, while certain embodiments of computer system 10 have been described as employing a distributed memory system, embodiments which do not employ a distributed memory system may utilize the flexible probe/probe response routing described herein as well. Such embodiments are contemplated.

Numerous variations and modifications will become apparent to those skilled in the art once the above disclosure is fully appreciated. It is intended that the following claims be interpreted to embrace all such variations and modifications.

What is claimed is:

1. A computer system comprising:
   a first node configured to initiate a transaction by transmitting a request; and
   a second node coupled to receive the request from the first node, wherein the second node is configured to generate a probe in response to the request, and wherein the probe includes an indication which designates a receiving node to receive responses to the probe, and wherein the receiving node is the first node responsive to the transaction having a first type, and wherein the receiving node is the second node responsive to the transaction having a second type.

2. The computer system as recited in claim 1 wherein the probe comprises a packet including a command field identifying the packet as the probe, and wherein the indication is included within the command field.

3. The computer system as recited in claim 1 further comprising a third node coupled to receive the probe.

4. The computer system as recited in claim 3 wherein the third node is configured to generate a probe response, and wherein the third node is configured to route the probe response responsive to the indication.

5. The computer system as recited in claim 1 wherein the second type is a write of a first number of bytes, the first number of bytes being less than a second number of bytes in a cache block of data.

6. The computer system as recited in claim 5 wherein the first type is other than the write.

7. The computer system as recited in claim 1 wherein the probe comprises a first packet including a target node field identifying the second node and a source node field identifying the first node.

8. The computer system as recited in claim 7 further comprising a third node coupled to receive the probe and generate a probe response in response to the probe, and wherein the probe response comprises a second packet including a response node field, and wherein the third node is configured to use a value from the target node field of the first packet as the value in the response node field responsive to the indication designating the second node as the receiving node.

9. The computer system as recited in claim 8 wherein the third node is configured to use a value from the source node field of the first packet as the value in the response node field responsive to the indication designating the first node as the receiving node.

10. The computer system as recited in claim 1 wherein the second node comprises a memory controller configured to communicate with a memory in which the cache block is stored, and wherein the memory controller is configured to generate the probe in response to selecting the request to access the memory.

11. A method for maintaining coherency in a computer system, the method comprising:
    transmitting a request from a source node to a target node to initiate a transaction;
    generating a probe in the target node responsive to the request; and
    designating a receiving node for responses to the probe via an indication within the probe responsive to a type of the transaction, wherein the receiving node is the source node responsive to the transaction having a first type, and wherein the receiving node is the target node responsive to the transaction having a second type.

12. The method as recited in claim 11 further comprising routing a probe response to the one or more probes to the receiving node.

13. The method as recited in claim 11 wherein the second type is a write of a first number of bytes, the first number of bytes being less than a second number of bytes in a cache block of data.

14. The method as recited in claim 13 wherein the first type is other than the write.

15. A first node comprising a circuit coupled to receive a request generated by a second node to initiate a transaction, wherein the circuit is configured to generate a probe in response to the request, and wherein the probe includes an indication which designates a receiving node to receive responses to the probe, and wherein the receiving node is the first node responsive to the transaction having a first type, and wherein the receiving node is the second node responsive to the transaction having a second type.

16. The first node as recited in claim 15 wherein the probe comprises a packet including a command field identifying the packet as the probe, and wherein the indication is included within the command field.

17. The first node as recited in claim 15 wherein the first type is a write of a first number of bytes, the first number of bytes being less than a second number of bytes in a cache block of data.

18. The first node as recited in claim 17 wherein the second type is other than the write.

19. The first node as recited in claim 15 wherein the probe comprises a first packet including a target node field identifying the first node and a source node field identifying the second node.

20. The first node as recited in claim 15 wherein the circuit comprises a memory controller configured to communicate with a memory in which the cache block is stored, and wherein the memory controller is configured to generate the probe in response to selecting the request to access the memory.

21. A computer system comprising a plurality of nodes coupled via a plurality of links, wherein the plurality of nodes are configured to participate in a transaction, and wherein a first node of the plurality of nodes is a source node of the transaction configured to generate a request, and wherein a second node of the plurality of nodes is a target node of the transaction and is coupled to a memory including a cache block addressed by the transaction, and wherein the second node is configured to generate a probe in response to the request, wherein the probe includes an indication which designates a receiving node to receive responses to the probe, and wherein the receiving node is the source node responsive to the transaction having a first type, and wherein the receiving node is the target node responsive to the transaction having a second type.

22. The computer system as recited in claim 21 wherein the probe comprises a packet including a command field identifying the packet as the probe, and wherein the indication is included within the command field.

23. The computer system as recited in claim 21 where a third node of the plurality of nodes is coupled to receive the probe.

24. The computer system as recited in claim 23 wherein the third node is configured to generate a probe response, and wherein the third node is configured to route the probe response responsive to the indication.

25. The computer system as recited in claim 21 wherein the second type is a write of a first number of bytes, the first number of bytes being less than a second number of bytes in a cache block of data.

26. The computer system as recited in claim 25 wherein the first type is other than the write.

27. The computer system as recited in claim 21 wherein the probe comprises a first packet including a target node field identifying the target node and a source node field identifying the source node.

28. The computer system as recited in claim 27 further comprising a third node coupled to receive the probe and generate a probe response in response to the probe, and wherein the probe response comprises a second packet including a response node field, and wherein the third node is configured to use a value from the target node field of the first packet as the value in the response node field responsive to the indication designating the target node as the receiving node.

29. The computer system as recited in claim 28 wherein the third node is configured to use a value from the source node field of the first packet as the value in the response node field responsive to the indication designating the source node as the receiving node.

30. The computer system as recited in claim 21 wherein the second node comprises a memory controller configured to communicate with a memory in which the cache block is stored, and wherein the memory controller is configured to generate the probe in response to selecting the request to access the memory.

* * * * *